United States Patent [19]
Choe et al.

[11] Patent Number: 5,382,280
[45] Date of Patent: Jan. 17, 1995

[54] TWO STAGE PRESSURE SWING ADSORPTION PROCESS FOR PRODUCING THE LESS STRONGLY ADSORBED COMPONENT OF A FEED GAS MIXTURE

[75] Inventors: Jung S. Choe, Harleysville; Lyndon J. Kellogg, Jr., Salington; Robert F. Weimer, Allentown, all of Pa.

[73] Assignee: Air Products and Chemicals, Inc., Allentown, Pa.

[21] Appl. No.: 153,387

[22] Filed: Nov. 16, 1993

[51] Int. Cl.⁶ .............................................. B01D 53/04
[52] U.S. Cl. ............................................ 95/98; 95/105; 95/138
[58] Field of Search .................... 95/98, 105, 138, 148

[56] References Cited

U.S. PATENT DOCUMENTS

| | | | |
|---|---|---|---|
| 2,918,140 | 12/1959 | Brooks | 95/98 |
| 3,102,013 | 8/1963 | Skarstrom | 95/105 |
| 3,237,379 | 3/1966 | Kant et al. | 95/98 |
| 3,923,477 | 12/1975 | Armond et al. | 95/138 X |
| 3,996,028 | 12/1976 | Golovko et al. | 95/138 X |
| 4,572,723 | 2/1986 | Ward | 95/138 X |
| 4,732,578 | 3/1988 | Benkmann | 95/98 X |
| 5,126,466 | 6/1992 | Ramprasad et al. | 556/138 |
| 5,141,725 | 8/1992 | Ramprasad et al. | 423/219 |
| 5,164,355 | 11/1992 | Farris et al. | 95/138 X |
| 5,208,335 | 5/1993 | Ramprasad et al. | 544/225 |
| 5,234,472 | 8/1993 | Krishnamurthy et al. | 95/98 |
| 5,239,098 | 8/1993 | Ramprasad | 556/140 |
| 5,240,474 | 8/1993 | Auvil et al. | 95/138 X |
| 5,260,043 | 11/1993 | Li et al. | 423/239 |
| 5,275,640 | 1/1994 | Schroter et al. | 95/138 X |

FOREIGN PATENT DOCUMENTS

| | | | |
|---|---|---|---|
| 3626562 | 2/1988 | Germany | 95/98 |
| 240914 | 10/1988 | Japan . | |
| 2227685 | 12/1992 | United Kingdom . | |

*Primary Examiner*—Robert Spitzer
*Attorney, Agent, or Firm*—Robert J. Wolff

[57] ABSTRACT

A two stage pressure swing adsorption process is set forth for producing the less strongly adsorbed component of a feed gas mixture wherein the first stage utilizes a first adsorbent for bulk removal of the more strongly adsorbed component and wherein the second stage utilizes a second adsorbent for trace removal of the more strongly adsorbed component. A further feature of the present invention is that the desorbed gas from the second stage's depressurization step (consisting primarily of the desired less strongly adsorbed component) is recycled to the first stage in order to improve its performance. In a preferred embodiment of the present invention, high purity nitrogen (less than 1000 ppm oxygen, preferably less than 100 ppm oxygen) is produced from an air feed using a kinetically controlled carbon molecular sieve adsorbent in the first stage and an equilibrium controlled metal complex-based adsorbent in the second stage.

8 Claims, 1 Drawing Sheet

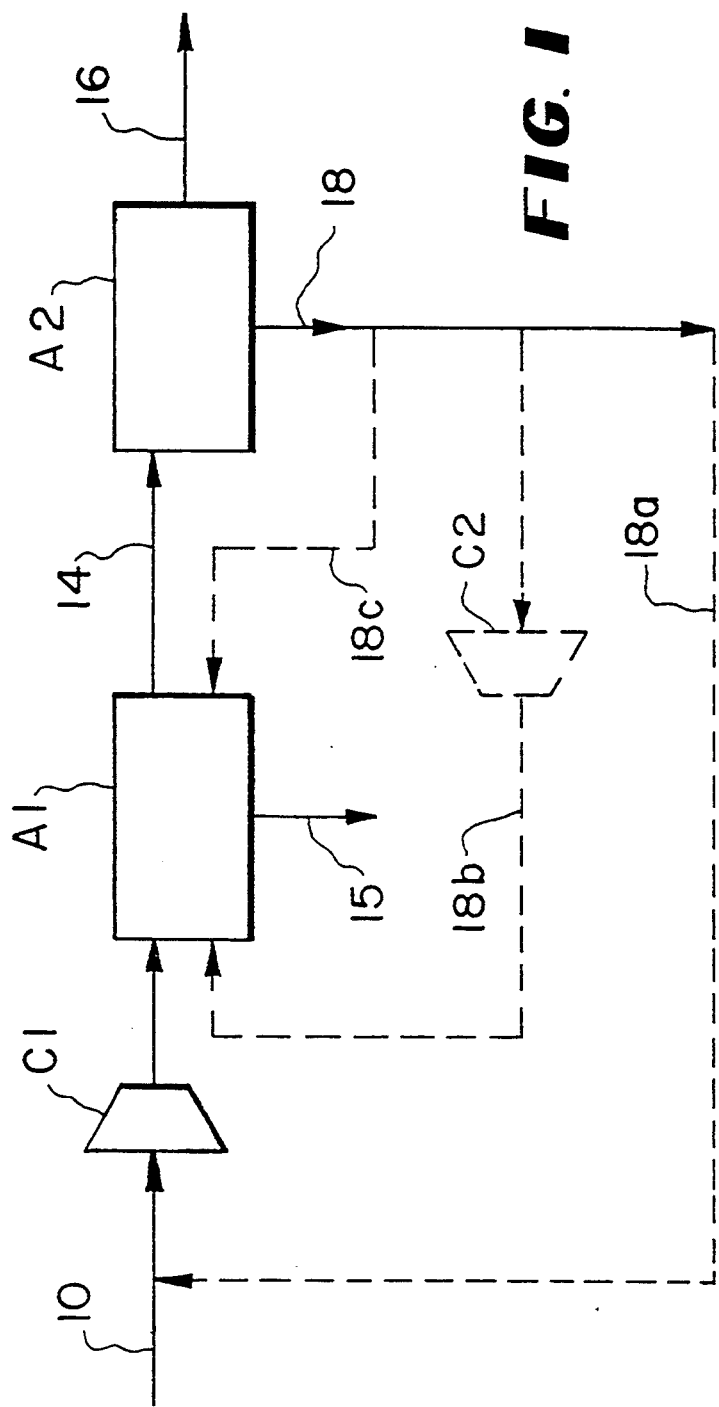

TWO STAGE PRESSURE SWING ADSORPTION PROCESS FOR PRODUCING THE LESS STRONGLY ADSORBED COMPONENT OF A FEED GAS MIXTURE

TECHNICAL FIELD

The present invention relates to a pressure swing adsorption process for producing the less strongly adsorbed component of a feed gas mixture which utilizes a first adsorbent for bulk removal of the more strongly adsorbed component and a second adsorbent for trace removal of the more strongly adsorbed component.

BACKGROUND OF THE INVENTION

A pressure swing adsorption (PSA) process for producing the less strongly adsorbed component of a feed gas mixture which utilizes a first adsorbent for bulk removal of the more strongly adsorbed component and a second adsorbent for trace removal of the more strongly adsorbed component is taught in the art. Specifically, Japanese Laid-Open Patent Application No. 63-240914 by Takahashi et al. teaches such a process in the context of:

(1) an air feed comprising oxygen as the more adsorbable component and nitrogen as the less adsorbable component;

(2) a kinetically controlled adsorbent (such as a carbon molecular sieve adsorbent) as the first adsorbent for bulk removal of the oxygen; and (3) an equilibrium controlled adsorbent (such as a metal complex-based adsorbent) as the second adsorbent for trace removal of the oxygen.

A key advantage of such a dual adsorbent design is that because the kinetically controlled adsorbent accomplishes the bulk of the oxygen removal, the rapid kinetics and high selectivity of the equilibrium controlled adsorbent can be utilized for trace oxygen removal without subjecting the equilibrium adsorbent to destructively high oxygen concentrations. This, in turn, allows a very high purity nitrogen product (less than 1000 ppm oxygen, preferably less than 100 ppm oxygen) to be produced. Heretofore, such high nitrogen purities generally required cryogenic technology (which is very capital and energy intensive) or deoxo technology (which, because it uses hydrogen to regenerate the catalyst/adsorbent, requires costly safety control systems in addition to producing a hydrogen and water vapor contaminated product).

There are concerns, however, with regard to Takahashi's single stage design whereby the adsorbents are layered in a single bed. In an ideal situation where the equilibrium controlled adsorbent's stability is comparable to the kinetically controlled adsorbent's stability, Takahashi's layered bed design is desirable. Unfortunately, most of the current equilibrium controlled adsorbents are not as stable as kinetically controlled adsorbents and thus have a higher replacement frequency which makes Takahashi's layered bed design undesirable. In addition, such a dual stage design lacks the flexibility for independent optimization of each layer's operating conditions. The present invention overcomes these concerns by using two stages whereby, for example, the kinetically controlled adsorbent is contained in the first stage and the equilibrium controlled adsorbent is contained in the second stage. In addition to accommodating the equilibrium controlled adsorbent's higher replacement frequency, such a dual stage design also provides the flexibility for independent optimization of each stage's operating conditions.

The present invention also provides for the efficient integration of the two stages in that the desorbed gas which is produced during depressurization of the second stage is recycled to the first stage (as additional feed for example) to improve the performance of the first stage. The reason that such a recycle scheme improves the performance of the first stage is that, because the first stage will already have removed most of the more adsorbable component from the fresh feed to the process, the desorbed gas from the second stage will consist primarily of the desired less adsorbable component. Indeed, the concentration of the desired component will be higher in the desorbed gas from the second stage vis-a-vis the fresh feed to the process. Thus, by recycling the second stage desorbed gas to the fresh feed to the process, the concentration of the desired component in the feed to the first stage is made higher than it would be otherwise. This gives the first stage a "head start" in concentrating the desired component which improves the performance of the first stage. The closest art to such recycling of the second stage desorbed gas is probably UK Patent 2,227,685 by Garrett et al. which teaches a single stage adsorption process wherein the desorbed gas from the latter part of the depressurization step is recycled to the feed.

SUMMARY OF THE INVENTION

The present invention is a two stage pressure swing adsorption process for producing the less strongly adsorbed component of a feed gas mixture wherein the first stage utilizes a first adsorbent for bulk removal of the more strongly adsorbed component and wherein the second stage utilizes a second adsorbent for trace removal of the more strongly adsorbed component. A further feature of the present invention is that the desorbed gas from the second stage's depressurization step (consisting primarily of the desired less strongly adsorbed component) is recycled to the first stage in order to improve its performance. In a preferred embodiment of the present invention, high purity nitrogen (less than 1000 ppm oxygen, preferably less than 100 ppm oxygen) is produced from an air feed using a kinetically controlled carbon molecular sieve adsorbent in the first stage and an equilibrium controlled metal complex-based adsorbent in the second stage.

BRIEF DESCRIPTION OF THE DRAWINGS

FIG. 1 is a schematic diagram depicting a general embodiment of the present invention.

DETAILED DESCRIPTION OF THE INVENTION

The process of the present invention is best illustrated with reference to a general embodiment thereof such as FIG. 1's preferred embodiment wherein high purity nitrogen (less than 20 ppm oxygen) is produced from an air feed using a kinetically controlled carbon molecular sieve adsorbent in the first stage and an equilibrium controlled metal complex-based adsorbent in the second stage.

Referring now to FIG. 1, an air feed in line 10 comprising oxygen as the more adsorbable component and nitrogen as the desired less adsorbable component is compressed in compressor C1 and passed through first stage adsorption bed A1 which contains a carbon molecular sieve adsorbent selective for the retention and bulk removal of oxygen to produce a nitrogen-enriched (typically 95.0 to 99.9% nitrogen) intermediate product stream in line 14. This first stage adsorption step is continued for a controlled time period or until the concentration of oxygen in intermediate product stream 14 reaches a preset limit (typically around 1 to 3%).

The first stage adsorption bed A1 must then be regenerated in order to prepare it for a subsequent adsorption step. Such regeneration comprises first depressurizing A1 in order to desorb and withdraw the majority of the gas which was adsorbed in the adsorption step. This oxygen-enriched desorbed gas stream in line 15 is typically discarded as a waste stream. Next, A1 is purged with a nitrogen-enriched purge stream in line 18c in order to purge A1 of any oxygen which may remain in A1 after the depressurization step. Although not shown in FIG. 1, a portion of the effluent from this purge step (specifically the effluent from the later portion of the purge step since this portion will generally have a higher concentration of nitrogen) can be recycled to the feed. Finally, A1 is repressurized through its feed end with a nitrogen-enriched repressurization gas in line 18b.

The intermediate product stream in line 14 is passed through second stage adsorption bed A2 which contains a metal complex-based adsorbent selective for the retention and trace removal of the remaining oxygen to produce a final product stream in line 16 which is further enriched in nitrogen (typically at least 99.9% nitrogen). Similar to the first adsorption step, this second adsorption step is continued for a controlled time period or until the concentration of oxygen in the final product stream reaches a preset limit (typically less than 0.1%). A preferred class of metal complex-based adsorbents to be used in this adsorption step are the cobalt-based adsorbents taught in U.S. Pat. Nos. 5,126,466; 5,141,725; 5,208,335 and 5,239,098 all by Ramprasad et al. As discussed in these patents, the Ramprasad adsorbents are preferred in that they have the following properties:

(1) a reversible isotherm having a Langmuir Type I shape;
(2) fast adsorption and desorption kinetics;
(3) infinite selectivity for oxygen;
(4) no phase change in oxygenation/deoxygenation cycle;
(5) a pressure swing working capacity which is sufficient to avoid the use of a vacuum during regeneration; and
(6) a structural integrity which is sufficient to avoid the need to be supported and which therefore allows the adsorbent to be used in small bed volumes.

As with the first stage adsorption bed, the second stage adsorption bed must then be regenerated in order to prepare it for a subsequent adsorption step. Such regeneration comprises first depressurizing A2 in order to desorb and withdraw the majority of the gas which was adsorbed in the adsorption step. Because most of the oxygen in the fresh feed to the process will already have been removed in the first stage, this desorbed gas stream in line 18 will consist primarily of nitrogen (typically around 95% nitrogen or higher) and is thus advantageously recycled to the first stage adsorption bed in order to improve its performance. (As will be shown in the Example below, the performance improvement is generally determined by any increase in the product recovery and bed productivity).

A first recycle option (recycle option A), as represented by line 18a in FIG. 1, is to mix recycle stream 18 with the fresh feed in line 10. The concentration of nitrogen in the resulting mixed stream is higher than the fresh feed and the performance of A1 is improved accordingly. In this first recycle option, a portion of intermediate product stream 14 is used as both A1's purge gas and A1's repressurization gas.

A second recycle option (recycle option B), as represented by line 18b and compressor C2 in FIG. 1, is to compress recycle stream 18 and use it as A1's repressurization gas. (It is also possible to consolidate the function of compressor C2 with feed compressor C1). In this second recycle option, a portion of intermediate product stream 14 is used as A1's purge gas.

A third recycle option (recycle option C), as represented by line 18c in FIG. 1, is to use recycle stream 18 as A1's purge gas. If the amount of the recycle stream is larger than what is needed for the purge step, this excess amount or "overpurge" can be compressed and recycled to the feed upon exiting the bed essentially unchanged in composition during the later part of the purge step. Alternatively, this excess amount can bypass the purge step entirely and be recycled to the feed. In this third recycle option, a portion of intermediate product stream 14 is used as A1's repressurization gas.

Continuing with the regeneration of A2, A2 is purged after its depressurization with a portion of the final product stream (not shown) in order to purge A2 of any oxygen which may remain in A2 after the depressurization step wherein the effluent from this purge step is recycled to the feed. Finally, regeneration of A2 is completed by repressurizing A2 with a portion of the final product stream (not shown).

The following example is offered to demonstrate the efficacy of the present invention.

EXAMPLE

The purpose of this example is to demonstrate the improved product recovery that results from the present invention's recycling of the second stage desorbed gas to the first stage. This was accomplished by simulating 4 cases for comparison: a base case representing FIG. 1's embodiment where no recycle of the desorbed gas from the second stage is implemented and cases A, B and C representing FIG. 1's embodiment wherein recycle options A, B and C (as discussed above) are implemented respectively. To ensure the accuracy of the comparison, each case produces (1) an intermediate nitrogen product stream containing 99% nitrogen; (2) a final nitrogen product stream containing 20 ppm oxygen; and (3) a desorbed gas stream from the second stage containing 96% nitrogen. Table 1 summarizes the overall product recovery (final product/feed to the first stage x 100%). As shown in Table 1, recycle options A, B and C enjoy, respectively, a 5%, 9% and 15% advantage in product recovery over the base case. In addition to providing improved product recoveries over the base case, cases A, B and C also provide an improved adsorption bed productivity over the base case thereby enabling a size reduction for the first stage adsorption bed.

TABLE 1

| | Product Recovery | Improvement over Base Case |
|---|---|---|
| Base Case | 28.9% | — |
| Recycle Option A | 30.3% | 5% |

TABLE 1-continued

| | Product Recovery | Improvement over Base Case |
|---|---|---|
| Recycle Option B | 31.6% | 9% |
| Recycle Option C | 33.1% | 15% |

Similar recovery and productivity benefits can also be realized for the removal of oxygen from oxygen/argon feed mixtures. Furthermore, the present invention makes it possible to relax the operating conditions of cryogenic oxygen/argon separations in such a way that higher oxygen purity levels are allowed in the crude argon stream produced by such a separation, thereby enabling a simpler and lower cost cryogenic unit.

It should be noted that in a preferred operational mode for FIG. 1, the above described steps are performed as a continually repeating cycle of steps in a system comprising a plurality of adsorption beds which each undergo their respective cycle of steps while collectively operated sequentially in parallel with one another.

It should further be noted that the scope of the present invention includes the following variations to FIG. 1's embodiment:

(1) A variation wherein the recycle stream is split between lines 18a and/or 18b and/or 18c in any desired proportions;

(2) To the extent that a portion of the desorbed gas stream from the second stage has a nitrogen concentration lower than the fresh feed's nitrogen concentration, a variation wherein this portion is discarded instead of recycled;

(3) A variation wherein only a portion of the purge gas required by A1 is supplied via the recycle stream while the remaining portion is supplied with a portion of the intermediate product stream; and (4) A variation wherein only a portion of the repressurization gas required by A1 is supplied via the recycle stream while the remaining portion is supplied with a portion of the intermediate product stream.

Finally, it should be noted that the present invention can also incorporate other steps which are well known in the PSA art such as the following:

(1) With respect to a system comprising a plurality of adsorption beds which each undergo their respective cycle of steps while collectively operated sequentially in parallel with one another, one or more pressure equalization transfers, during each of which, a portion of the depressurization effluent from one of said plurality of beds is transferred to another bed as partial repressurization gas, thereby equalizing the pressures of the two beds involved in each pressure equalization transfer;

(2) Depressurization to sub-ambient pressure levels (i.e. vacuum swing adsorption or VSA); and (3) Pretreatment steps for the removal of impurities from the feed gas (such as water) which would otherwise interfere with the process of the present invention.

The present invention has been described with reference to a general embodiment thereof. This embodiment should not be seen as a limitation of the scope of the present invention; the scope of such being ascertained by the following claims.

We claim:

1. Regarding a feed gas mixture consisting of a more strongly adsorbed component and a less strongly adsorbed component, a two stage pressure swing adsorption process for producing said less strongly adsorbed component comprising the steps of:

(a) passing the feed gas mixture through a first stage adsorption bed which contains an adsorbent selective for the retention and bulk removal of the more strongly adsorbed component to produce an intermediate product stream enriched in the less strongly adsorbed component wherein this step (a) is continued for a controlled time period or until the concentration of the more strongly adsorbed component in the intermediate product stream reaches a preset limit;

(b) regenerating the first stage adsorption bed wherein said regenerating comprises:
  (1) depressurizing the first stage adsorption bed by withdrawing a desorbed gas stream from the first stage adsorption bed; and
  (2) repressurizing the first stage adsorption bed by introducing repressurization gas into the first stage adsorption bed;

(c) passing the intermediate product stream through a second stage adsorption bed which contains an adsorbent selective for the retention and trace removal of the more strongly adsorbed component to produce a final product stream further enriched in the less strongly adsorbed component wherein this step (c) is continued for a controlled time period or until the concentration of the more strongly adsorbed component in the final product stream reaches a preset limit; and (d) regenerating the second stage adsorption bed wherein said regenerating comprises:
  (1) depressurizing the second stage adsorption bed by withdrawing a desorbed gas stream from the second stage adsorption bed wherein at least a portion of said desorbed gas stream is recycled as a portion of the feed gas in step (a) and/or at least a portion of the repressurization gas in step (b)(2); and
  (2) repressurizing the second stage adsorption bed by introducing repressurization gas into the second stage adsorption bed.

2. The process of claim 1 wherein steps (a) through (d) are performed as a continually repeating cycle of steps in a system comprising a plurality of adsorption beds which each undergo their respective cycle of steps while collectively operated sequentially in parallel with one another.

3. Regarding a feed gas mixture consisting of a more strongly adsorbed component and a less strongly adsorbed component, a two stage pressure swing adsorption process for producing said less strongly adsorbed component comprising the steps of:

(a) passing the feed gas mixture through a first stage adsorption bed which contains an adsorbent selective for the retention and bulk removal of the more strongly adsorbed component to produce an intermediate product stream enriched in the less strongly adsorbed component wherein this step (a) is continued for a controlled time period or until the concentration of the more strongly adsorbed component in the intermediate product stream reaches a preset limit; and (b) regenerating the first stage adsorption bed wherein said regenerating comprises:
  (1) depressurizing the first stage adsorption bed by withdrawing a desorbed gas stream from the first stage adsorption bed;

(2) purging the first stage adsorption bed with a purge gas in order to purge the first stage adsorption bed of any of the more strongly adsorbed component which may remain in the first stage adsorption bed after step (b)(1) above; and (3) repressurizing the first stage adsorption bed by introducing repressurization gas into the first stage adsorption bed;

(c) passing the intermediate product stream through a second stage adsorption bed which contains an adsorbent selective for the retention and trace removal of the more strongly adsorbed component to produce a final product stream further enriched in the less strongly adsorbed component wherein this step (c) is continued for a controlled time period or until the concentration of the more strongly adsorbed component in the final product stream reaches a preset limit; and (d) regenerating the second stage adsorption bed wherein said regenerating comprises:

(1) depressurizing the second stage adsorption bed by withdrawing a desorbed gas stream from the second stage adsorption bed wherein a first portion of said desorbed gas stream is recycled as a portion of the feed gas in step (a) and/or at least a portion of the repressurization gas in step (b)(3) and wherein a second portion of said desorbed gas stream is recycled as at least a portion of the purge gas in step (b)(2); and (2) repressurizing the second stage adsorption bed by introducing repressurization gas into the second stage adsorption bed.

4. The process of claim 3 wherein a portion of the purge effluent from step (b)(2) is recycled as a portion of the feed gas in step (a).

5. The process of claim 4 wherein steps (a) through (d) are performed as a continually repeating cycle of steps in a system comprising a plurality of adsorption beds which each undergo their respective cycle of steps while collectively operated sequentially in parallel with one another.

6. The process of claim 5 wherein:

(a) the feed gas mixture is an air feed comprising oxygen as the more strongly adsorbed component and nitrogen as the less strongly adsorbed component;

(b) the adsorbent contained in the first stage adsorption bed comprises a kinetically controlled carbon molecular sieve adsorbent; and (c) the adsorbent contained in the second stage adsorption bed comprises an equilibrium controlled metal complex-based adsorbent; and (d) the oxygen concentration of the final product stream produced in step (c) is less than 100 ppm oxygen.

7. The process of claim 6 wherein the equilibrium controlled metal complex-based adsorbent is a cobalt-based adsorbent.

8. The process of claim 5 wherein the feed gas mixture is an oxygen/argon mixture comprising oxygen as the more strongly adsorbed component and argon as the less strongly adsorbed component.

* * * * *